G. B. TAYLOR.
MACHINE FOR CUTTING OFF PIECES FROM BARS.
APPLICATION FILED DEC. 26, 1916.

1,288,283.

Patented Dec. 17, 1918.
2 SHEETS—SHEET 1.

Witnesses
C. D. Kesler
M. E. McDade.

Inventor
George B. Taylor
by
Amos L. Norris
Attorney

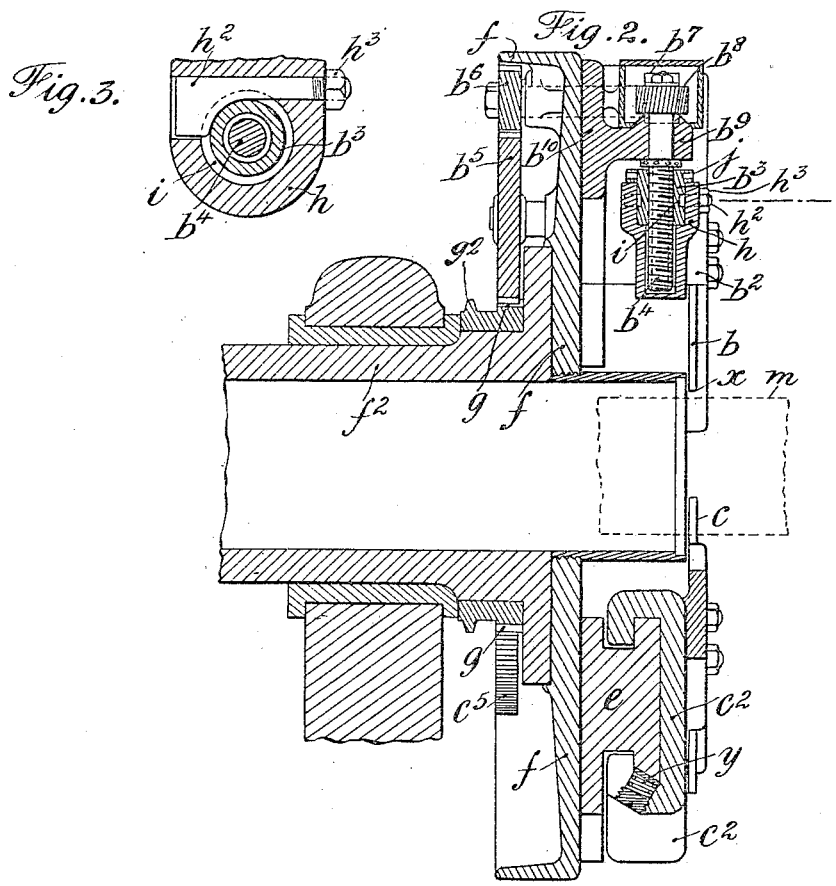

UNITED STATES PATENT OFFICE.

GEORGE BENJAMIN TAYLOR, OF BIRMINGHAM, ENGLAND.

MACHINE FOR CUTTING OFF PIECES FROM BARS.

1,288,283.  Specification of Letters Patent.  Patented Dec. 17, 1918.

Application filed December 26, 1916. Serial No. 139,020.

*To all whom it may concern:*

Be it known that I, GEORGE BENJAMIN TAYLOR, a subject of the King of Great Britain, residing at Bartholomew street, Birmingham, in the county of Warwick, England, have invented certain new and useful Improvements in Machines for Cutting off Pieces from Bars, of which the following is a specification.

The type of cutting off machine to which the invention refers is well known. The bar to be cut is held stationary in line with the axis of a hollow spindle adapted to revolve a cutter head on which two, three, or more cutters are radially arranged to be simultaneously and collectively advanced for operation on the bar and afterward retired, such a machine being described in the specifications of prior British Letters Patents No. 25223 of 1910 and No. 17487 of 1913, which also embody arrangements for automatically insuring equalization of the amount of work of the cutters on the bar.

In this type of machine it has previously been proposed to provide between the tool carriers and the tool traversing means therefor hand operated mechanical devices for finely setting the tools to the work independently of said traverse, said traversing means being located at the back of the face plate to be driven from a rotatable toothed wheel.

The present invention provides in such a machine a combination of parts by which the tool carriers are made to offer resistance to movement by the operation of springs, and by which said tool carriers are arranged on the front of the face plate to be moved for finely setting the tools to the work by the revolution of screw boxes with which the traversing screws engage, which latter and the screw boxes are arranged on the front of said revolving face plate. The resistance of the tool carriers by the spring pressure is substantially constant, and is necessary to enable fine setting of the tool edge up to the work and to prevent the slides falling inwardly by their own weight and the weight of the parts they carry, and also to ensure that said tool carriers shall always be kept up to the thrust face of the traversing screws.

The invention is represented by the accompanying drawings.

Fig. 2 is an axial section of Fig. 1.

Fig. 3 is a detail section through Fig. 2 on the dotted lines.

Figure 1:
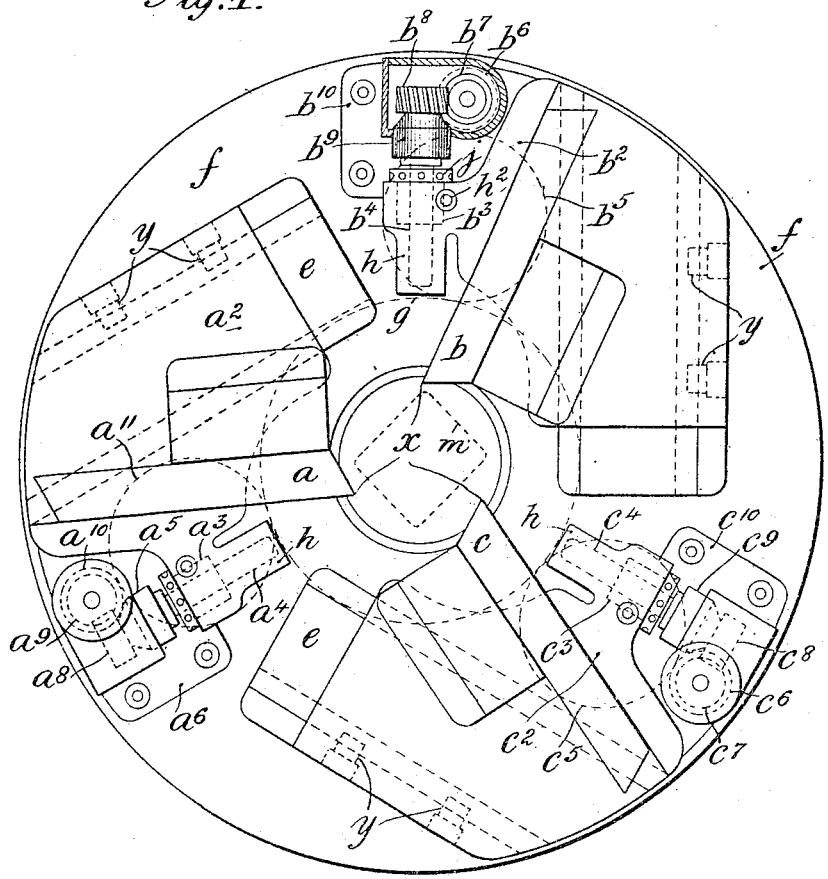
Figure 1 shows an elevation of the face plate on which the tool slides are mounted and coupled to a collective tool feed.

With reference to Figs. 1 and 2 three cutting tools $a$, $b$, and $c$ are arranged on the face plate $f$ which forms the greater part of the front of the machine and is mounted upon and revolved by the hollow spindle $f^2$. The cutting tool $a$ is carried by the slide $a^2$, the cutting tool $b$ by the slide $b^2$, and the cutting tool $c$ by the slide $c^2$, each of these slides being accurately fitted to carriers $e$ bolted fast to the face plate $f$. Said slides move tangentially upon the face plate but move the cutting points $x$ of the cutting tools radially. The screw boxes of the slides are respectively at $a^3$, $b^3$ and $c^3$, and the traversing screws therefor at $a^4$, $b^4$, and $c^4$. The bearings for said screws are respectively at $a^5$, $b^9$, $c^9$, upon brackets $a^6$, $b^{10}$, $c^{10}$, fixed on the face plate $f$. The screw $a^4$ is revolved by a worm wheel $a^8$ secured to its one end, a worm $a^9$ having bearings through the face plate, and intermeshing gear wheels $a^{10}$, $a^{11}$ and $g$, shown in dotted lines in Fig. 1. The gear wheel $g$ is integrally connected to a sprocket $g^2$ (Fig. 2) freely and concentrically revoluble upon the spindle $f^2$. This gear wheel $g$ also revolves the other two traversing screws $b^4$ $c^4$, said gear wheel meshing with and driving the gear wheels $b^5$ $c^5$ which have bearings on the back of the face plate, and which in turn drive the gear wheels $b^6$ $c^6$ also having bearings on the back of the face plate and to whose respective spindles are connected the worms $b^7$ $c^7$ which respectively drive the worm wheels $b^8$ $c^8$ fast upon the ends of the respective traversing screws $b^4$ $c^4$. There is therefore a common tool traversing means for all the tools $a$, $b$, and $c$, from the revolution of the sprocket $g^2$, substantially in accordance with the cited British patent No. 27487 of 1913, in which however, the bearings for the traversing screws were movably coupled, whereas in the present case said bearings are fixed to the face plate.

Each of the screw boxes $a^3$, $b^3$, and $c^3$ is revolubly, but otherwise immovably, fitted to its particular tool slide, so that for the normal traverse of said slide by the screw it is always a fixed part of said slide. For example the screw box $b^3$ engaged by the screw $b^4$ revolubly fits within a socket $h$ forming an integral part of the slide $b^2$, said screw box being formed with an annular groove $i$ and the socket $h$ being fitted with a transverse bolt $h^2$, shown particularly in Fig. 3, to positively and frictionally engage the groove to always hold the screw box firmly to the socket axially of the screw and against revolving in said socket when the bolt is tightly screwed up, but permitting of said revolution when the frictional pressure of the bolt is relieved by loosening the nut $h^3$. Said screw box is adapted to be revolved by hand application of a peg lever to the holes $j$ at the time the traversing screw $b^4$ is stationary, and as the screw box is always carried by the slide, $b^2$, and the bearing, $b^9$, for the traversing screw, $b^4$, is a fixture on the face plate $f$, any revolution of the screw box upon the stationary screw will traverse the slide $b^2$ and the tool it carries in one or the other direction.

The other screw boxes $a^3$ $c^3$ are fitted to the sockets $h$ of the respective slides $a^2$ $c^2$ and are arranged for operation in respect of said sockets and the particular traversing screws $a^4$ $c^4$ in manners identical with what has been hereinbefore described with reference to the screw box $b^3$, so that all the tool carrying slides can be adjusted in relation to the traversing screws to set the tools to the work quite independently of the common traversing means for the whole of the tool slides. An angular sectioned bar is indicated in Fig. 1 by the dotted line $m$ from which pieces are to be cut off, said section being irregular for illustration. The tools $a$, $b$, and $c$ are roughly fixed in their slidable holders $a^2$, $b^2$, $c^2$ so that their cutting edges are somewhat near the corners of the work $m$ and touching a radial line parallel to the axis of the traversing screws, said tools being thus roughly set to the work. Fine setting is now effected by the rotation of the screw boxes $a^3$, $b^3$, and $c^3$ within their sockets to bring the cutting edge of each tool up to the same corner of the work $m$ to touch a "feeler" which is interposed between the cutting edge of the tool and the bar; after these independent adjustments of the tools, the screw boxes are locked to the common traversing devices. The "feeler" may be a very thin metal plate. In this way each tool as the cutters revolve does an equal amount of work on the bar from the common feed for all the tools.

Each tool slide is fitted to its carrier $e$ to offer considerable resistance to movement so that back lash or inaccuracies in the connection of the slide through the screw to the feed are negligible in fine adjustment of the tool edge $x$ up to the work, it being a constructive part of the improvements to fit said slide to its carrier with considerable sustained frictional pressure created by the use of springs $y$ operating between said slide and the carrier. The manner in which said springs are applied is clearly represented by Fig. 2 and two of such springs are used for each slide.

If the invention is applied to a machine provided with an arrangement for equalizing the cut of the cutting tools on the work in accordance with the British patent referred to No. 27487 of 1913 the machine is fitted with devices for rendering said equalizing arrangement inoperative while the finely adjusting tool setting by hand is used, such devices converting the machine into one working in accordance with the present invention.

Having now described my invention what I claim and desire to secure by Letters Patent is:—

1. In combination with a cutting machine of the type embodying a revoluble spindle carrying a face plate provided with a plurality of radial cutting tools held by tangential slides having screw bearings fitted to carriers which are bolted fast to the base plate, of a feed screw fitted in each bearing, a gear train for driving each feed screw, and a gear mounted on the spindle and engaging all the gear trains to simultaneously rotate all the feed screws to uniformly advance the cutting tools, the screw bearings being revolubly associated with their respective slides to effect an individual rotation and adjustment of the feed screws independently of the said trains whereby the cutting tools may be finely set.

2. In combination with a cutting machine of the type embodying a revoluble spindle carrying a face plate provided with a plurality of radial cutting tools held by tangential slides having screw bearings fitted to carriers which are bolted fast to the face plate, of a feed screw fitted in each slide bearing, a gear train for driving each feed screw, a gear mounted on the spindle and engaging all the feed screws to uniformly advance the cutting tools, the screw bearings being revolubly associated with their respective slides to effect an independently adjustment thereof, and springs disposed between each slide and its carrier to set up a frictional pressure between the slides and carriers and thereby provide for suitable resistance to movement of the slides to avoid back lash or inaccuracies in the operation of the slides.

In testimony whereof I have hereunto set my hand in presence of two subscribing witnesses.

GEORGE BENJAMIN TAYLOR.

Witnesses:
  GEO. FUERY,
  D. LEAKER.